(12) United States Patent
Goldberg et al.

(10) Patent No.: US 7,383,513 B2
(45) Date of Patent: Jun. 3, 2008

(54) GRAPHICAL CONDITION BUILDER FOR FACILITATING DATABASE QUERIES

(75) Inventors: Joseph H. Goldberg, San Carlos, CA (US); Uday N. Gajendar, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 614 days.

(21) Appl. No.: 10/672,146

(22) Filed: Sep. 25, 2003

(65) Prior Publication Data

US 2005/0004911 A1    Jan. 6, 2005

Related U.S. Application Data

(60) Provisional application No. 60/413,914, filed on Sep. 25, 2002.

(51) Int. Cl.
G06F 3/00 (2006.01)
G06F 3/01 (2006.01)

(52) U.S. Cl. ............... 715/763; 715/866; 715/968; 707/1; 707/3; 707/4

(58) Field of Classification Search ........ 707/E17.016, 707/E17.03, 1, 3, 4; 717/105; 715/763
See application file for complete search history.

(56) References Cited

U.S. PATENT DOCUMENTS

| | | | | |
|---|---|---|---|---|
| 5,418,950 A | * | 5/1995 | Li et al. ............... | 707/4 |
| 5,428,737 A | * | 6/1995 | Li et al. ............... | 707/4 |
| 5,485,567 A | * | 1/1996 | Banning et al. ........ | 707/4 |
| 5,515,488 A | * | 5/1996 | Hoppe et al. .......... | 345/440 |
| 5,546,526 A | * | 8/1996 | Li et al. ............... | 715/837 |
| 5,555,354 A | * | 9/1996 | Strasnick et al. ...... | 345/427 |
| 5,623,592 A | | 4/1997 | Carlson et al. | |
| 5,668,966 A | * | 9/1997 | Ono et al. ............. | 715/853 |
| 5,678,013 A | | 10/1997 | Smith et al. | |
| 5,701,456 A | * | 12/1997 | Jacopi et al. .......... | 707/4 |

(Continued)

OTHER PUBLICATIONS

Katherine Malan, et al., "Visual Query Tools for Uncertain Spatio-Temporal Data," MM '01, Sep. 30-Oct. 5, 2001, Ottawa, Canada, pp. 522-524.

(Continued)

*Primary Examiner*—Weilun Lo
*Assistant Examiner*—Steven B. Theriault
(74) *Attorney, Agent, or Firm*—Hickman Palmero Truong & Becker LLP

(57) ABSTRACT

A graphical condition builder is provided that presents a graphical representation of a search query. In an embodiment, the graphical condition builder presents a graphical and numerical preview indicating the size of the expected query results set. In an embodiment, a graphical preview is provided that includes graphical preview portions having a shape suggestive of a funnel. In an embodiment, the graphical condition builder supports formulating queries for both relational and multidimentional databases. In an embodiment, the graphical condition builder displays a textual indication of the type of logical operation being performed. In an embodiment, the graphical condition builder determines the type of logical operator to apply depending on the relative location of icons representing filter objects. In an embodiment, order dependent filters are available to the user. In an embodiment, the search query is represented by query steps, and multiple filter objects may be contained in each query step.

22 Claims, 9 Drawing Sheets

U.S. PATENT DOCUMENTS

| | | | | |
|---|---|---|---|---|
| 5,721,900 | A | * | 2/1998 | Banning et al. .............. 707/4 |
| 5,721,901 | A | * | 2/1998 | Banning et al. .............. 707/4 |
| 5,841,437 | A | * | 11/1998 | Fishkin et al. ............. 345/619 |
| 5,842,203 | A | * | 11/1998 | D'Elena et al. ................ 707/4 |
| 5,886,698 | A | * | 3/1999 | Sciammarella et al. ..... 715/769 |
| 5,909,678 | A | * | 6/1999 | Bergman et al. .............. 707/4 |
| 5,966,126 | A | * | 10/1999 | Szabo ....................... 715/762 |
| 6,003,034 | A | * | 12/1999 | Tuli .......................... 707/101 |
| 6,101,493 | A | * | 8/2000 | Marshall et al. .............. 707/3 |
| 6,154,766 | A | * | 11/2000 | Yost et al. .................. 709/201 |
| 6,175,829 | B1 | * | 1/2001 | Li et al. ........................ 707/3 |
| 6,208,985 | B1 | * | 3/2001 | Krehel .......................... 707/3 |
| 6,243,093 | B1 | * | 6/2001 | Sklar ........................ 715/853 |
| 6,297,824 | B1 | * | 10/2001 | Hearst et al. ............... 715/848 |
| 6,326,962 | B1 | * | 12/2001 | Szabo ....................... 715/762 |
| 6,366,299 | B1 | * | 4/2002 | Lanning et al. ............. 715/738 |
| 6,470,335 | B1 | * | 10/2002 | Marusak ........................ 707/4 |
| 6,507,840 | B1 | * | 1/2003 | Ioannidis et al. .............. 707/4 |
| 6,556,225 | B1 | * | 4/2003 | MacPhail .................... 715/848 |
| 6,564,368 | B1 | * | 5/2003 | Beckett et al. .............. 717/113 |
| 6,640,221 | B1 | * | 10/2003 | Levine et al. .................. 707/3 |
| 6,658,404 | B1 | * | 12/2003 | Cecchini ....................... 707/3 |
| 6,694,326 | B2 | * | 2/2004 | Mayhew et al. ............ 707/102 |
| 6,744,449 | B2 | * | 6/2004 | MacLeod et al. ........... 715/772 |
| 6,768,997 | B2 | * | 7/2004 | Schirmer et al. ........... 707/102 |
| 6,785,668 | B1 | * | 8/2004 | Polo et al. ..................... 707/2 |
| 6,823,495 | B1 | * | 11/2004 | Vedula et al. ............... 715/805 |
| 6,886,138 | B2 | * | 4/2005 | Laffey et al. ............... 715/860 |
| 6,925,608 | B1 | * | 8/2005 | Neale et al. ................ 715/763 |
| 6,947,928 | B2 | * | 9/2005 | Dettinger et al. .............. 707/4 |
| 6,982,708 | B1 | * | 1/2006 | Mah et al. ................... 345/418 |
| 7,020,643 | B2 | * | 3/2006 | Mah et al. ..................... 706/46 |
| 7,099,809 | B2 | * | 8/2006 | Dori .............................. 703/6 |
| 7,149,983 | B1 | * | 12/2006 | Robertson et al. .......... 715/810 |
| 7,181,438 | B1 | * | 2/2007 | Szabo ........................... 707/2 |
| 2001/0003455 | A1 | * | 6/2001 | Grobler ...................... 345/418 |
| 2001/0051943 | A1 | * | 12/2001 | Drucker et al. ................ 707/3 |
| 2002/0087568 | A1 | * | 7/2002 | LeDonne et al. ........... 707/100 |
| 2002/0103794 | A1 | * | 8/2002 | Chang ........................... 707/3 |
| 2002/0107840 | A1 | * | 8/2002 | Rishe ............................ 707/3 |
| 2002/0138472 | A1 | * | 9/2002 | Ricciardi ....................... 707/3 |
| 2002/0169759 | A1 | * | 11/2002 | Kraft et al. .................... 707/3 |
| 2003/0167455 | A1 | * | 9/2003 | Iborra et al. ................ 717/105 |
| 2004/0153435 | A1 | * | 8/2004 | Gudbjartsson et al. ......... 707/1 |
| 2005/0005266 | A1 | * | 1/2005 | Datig .......................... 717/136 |
| 2005/0256852 | A1 | * | 11/2005 | McNall et al. ................. 707/3 |
| 2006/0041562 | A1 | * | 2/2006 | Paczkowski et al. .......... 707/10 |
| 2006/0106783 | A1 | * | 5/2006 | Saffer et al. ................... 707/3 |
| 2006/0200462 | A1 | * | 9/2006 | Kadayam et al. .............. 707/5 |
| 2006/0229896 | A1 | * | 10/2006 | Rosen et al. ................... 705/1 |

OTHER PUBLICATIONS

Steve Jones, "Dynamic Query Result Previews for a Digital Library," ACM, 1988, pp. 291-292.

Steve Jones, "Graphical Query Specification and Dynamic Result Previews for a Digital Library," UIST '98, San Francisco, CA, ACM, 1998, pp. 143-151.

Yannis Ioannidis, et al., "Histogram-Based Solutions to Diverse Database Estimation Problems," 1995, Data Engineering Bulletin, vol. 18, No. 3, pp. 10-18, 1995.

Peter G. Anick, et al., "A Direct Manipulation Interface for Boolean Information Retrieval via Natural Language Query," ACM, 1990, pp. 135-150.

Christopher Ahlberg, et al., "Dynamic Queries for Information Exploration: An Implementation and Evaluation," CHI '92, May 3-7, 1992, ACM, pp. 619-626.

John F. Pane, et al., "Tabular and Textual Methods for Selecting Objects from a Group," Proceedings of VL 2000: IEEE International Symposium on Visual Languages; Seattle, WA: IEEE Computer Society, Sep. 10-13, 2000, pp. 157-164.

Sylvia Willie, et al., "Users' Models of the Information Space: the case for two search models," ACM, 1995, pp. 205-210.

Catherine Plaisant, et al., "Interface and Data Architecture for Query Preview in Networked Information Systems," ACM Transactions on Information Systems, vol. 17, No. 3, Jul. 1999, pp. 320-341.

Catherine Plaisant, et al., "Dynamaps: Dynamic Queries on a Health Statistics Atlas," ACM, 1994, pp. 439-440.

John F. Pane, et al., "Improving User Performance on Boolean Queries," CHI 2000 Extended Abstracts: Conference on Human Factors in Computing Systems, G. Szwillus and T. Turner, Eds. The Hague, Netherlands: ACM Press, Apr. 1-6, 2000, pp. 269-270.

Degi Young, et al., "A Graphical Filter/Flow Representation of Boolean Queries: A Prototype Implementation and Evaluation," Feb. 1993, J. Am. Soc. Info. Sci., 44 (6), pp. 327-339.

A. Michard, "Graphical presentation of Boolean expressions in a database query language: design notes and an ergonomic evaluation," Behaviour and Information Technology, 1982, vol. 1, No. 3, pp. 279-288.

Oracle Corporation, "Feature Overview, Oracle9iAS Discoverer," 2004, http://otn.oracle.com/products/discoverer/htdocs/Oracle9iAS20_Disco_FOV.html, data retrieved Jan. 26, 2004, p. 1-4.

Oracle Corporation, "Oracle9iAS Daily Feature, Safe and Sound Discoverer: Simplified access to the e-Business Suite," 2004, http://otn.oracle.com/products/ias/daily/aug24.html, data retrieved Jan. 26, 2004, pp. 1-4.

Oracel Corporation, "Oracle9iAS Daily Feature, Built for Speed Discoverer: Performance," 2004, http://otn.oracle.com/products/ias/daily/sept25.html, data retrieved Jan. 25, 2004, pp. 1-2.

Oracle Corporation, "Oracle9iAS Daily Feature, Oracle9iAS Discoverer: Uncommon Intelligence—Analytic Functions," 2004, http://otn.oracle.com/products/ias/daily/oct18.html, data retrieved Jan. 25, 2004, pp. 1-4.

Oracle Corporation, "Oracle9iAS Daily Feature, Oracle9iAS Discoverer: Integration with Reports," 2004, http://otn.oracle.com/products/ias/daily/feb06.html, data retrieved Jan. 25, 2004, pp. 1-3.

Oracle Corporation, "Oracle9iAS Daily Feature, Oracle9iAS Discoverer: Real World Analytic Power," 2004, http://otn.oracle.com/products/ias/daily/mar22.html, data retrieved Jan. 25, 2004, pp. 1-5.

Oracle Corporation, "Oracle9iAS Daily Feature, Safe and Sound, Oracle9iAS Discoverer: Simplified Access to the E-Business Suite," 2004, http://otn.oracle.com/products/ias/daily/july26.html, data retrieved Jan. 25, 2004, pp. 1-4.

Oracle Corporation, Oracle9iAS Daily Feature, Oracle9iAS Discoverer: User Intelligence—Administrative Workbooks, 2004, http://otn.oracle.com/products/ias/daily/oct25.html, data retrieved Jan. 25, 2004, pp. 1-4.

Oracle Corporation, "Oracle9iAS Daily Feature, Oracle 9iAS Discoverer: End User Layer (EUL)," 2004, http://otn.oracle.com/products/ias/daily/may16.html, data retrieved Jan. 25, 2004, pp. 1-3.

Oracle Corporation, "Oracle9iAS Daily Feature, Oracle9iAS Discoverer: Drilling for Information," 2004, http://otn.oracle.com/products/ias/daily/may03.html, data retrieved Jan. 25, 2004, pp. 1-3.

Oracle Corporation, "Overview of Oracle9i," Oracle9i Database New Features, Release 2 (9.2), Part No. A96531-02, 1996, 2002, pp. 1-4.

Oracle Corporation, "AW_Cube_Create_Access Procedure," Oracle9i OLAP User's Guide, Release 2 (9.2.0.2), Part No. A95295-02, 2001, 2002, pp. 1-2.

Oracle Corporation, "How Discoverer 3i Viewer Works," Oracle8i Application Developer's Guide—XML, Release 3 (8.1.7), Part No. A86030-01, 1996-2000, pp. 1-2.

Oracle Corporation, "Discoverer 3i Viewer: Overview," Oracle8i Application Developer's Guide—XML, Release 3 (8.1.7), Part No. A86030-01, 1996-2000, pp. 1-2.

Oracle Corporation, "Summary Advisor," Oracle8i Data Warehousing Guide, Releases 2 (8.1.6), Part No. A76994-01, 1996-2000, pp. 1-8.

Oracle Corporation, "Oracle Advanced Queuing and JMS," Oracle8i Integration Server Overview, Release 3 (8.1.7), Part No. A83729-01, 1996-2000, pp. 1, 15, 16.

Oracle Corporation, "Oracle9iAS Discoverer," An Oracle White Paper, Feb. 2001, http://otn.oracle.com/products/discoverer/pdf/4iTechWP.pdf, pp. 1-14.

Christopher H. Barron, Oracle Corporation, "Oracle9iAS Discoverer Version 4.1 Capacity Planning Guide," An Oracle White Paper, Apr. 2003, http://otn.oracle.com/products/discoverer/pdf/Oracle9iASDiscoverer_A_Capacity_Planning_Guide.pdf, pp. 1-16.

Oracle Corporation, "Oracle9iAS Technical Tip, Weekly Technical Tip—Jul. 1, 2002," 2003, pp. 1-2.

James Niccolai, "Oracle upgrades Internet application server," Oct. 2, 2000, *InfoWorld Daily News*, pp. 1-2.

Oracle Corporation, "Oracle® Forms Developer Release 6i," New Features, Patch 2 for Windows or UNIX, Oct. 2000, Part No. A86781-01, pp. 1-3.

Oracle Corporation, "Creating Metadata Using Oracle Enterprise Manager," Oracle9i OLAP User's Guide, Release 2 (9.2.0.2), Part No. A95295-02, 2001, 2002, pp. 1-4.

Oracle Corporation, "Introducing the BI Beans," Oracle9i OLAP User's Guide, Release 2 (9.2.0.2), Part No. A95295-02, 2001, 2002, pp. 1-6.

Oracle Corporation, "Supporting Forms Developer Tools," 2004, http://otn.oracle.com/products/forms/htdocs/d2k/fe/fe1_3d.htm?_template=/otn/content/print, 1 page.

Oracle Corporation, "Query Builder: Forms Developer 6i Quick Tour," 2004, http://otn.oracle.com/products/forms/htdocs/d2k/gb/gb1.htm?_template=/otn/content/print, pp. qb1-qb1_8.

Oracle Corporation, "Data Warehouse Requirements," Oracle9i OLAP User's Guide, Release 2 (9.2.0.2), Part No. A95295-02, 2001, 2002, pp. 1-2.

* cited by examiner

GRAPHICAL CONDITION BUILDER FOR FACILITATING DATABASE QUERIES

RELATED APPLICATIONS

This application claims priority benefit of U.S. Provisional Patent Application, Ser. No. 60/413,914, filed Sep. 25, 2002, which is hereby incorporated by reference in its entirety.

FIELD OF THE INVENTION

The invention relates to User Interfaces (UI) in general, and more specifically to a UI for writing search queries.

BACKGROUND

Query construction can be thought of as a two-stage process having an assembly stage followed by a refinement stage, as discussed by Willis et al. "Users' Models of the Information Space: The Case for Two Search Models," Proceedings of the ACM Special Interest Group on Information Retrieval (SIGIR) '95, (Seattle Wash., 1995), ACM Press, pp. 205-210 and Plaisant et al., "Interface and Data Architecture for Query Preview in Networked Information Systems," ACM Transactions on Information Systems, 17, 3 (July 1999), pp. 320-341. The assembly stage gathers together relevant information, and the refinement stage iteratively narrows and nests the user's focus until a desired set is achieved.

However, use of Boolean operators is difficult for novice users because, for example, common language usages of these terms can be the opposite of their usage in Boolean expressions, as discussed by Pane et al., "Tabular and Textual Methods for Selecting Objects from a Group," Proceedings of VL 2000: IEEE Int. Symposium on Visual Languages (Seattle, Wash., September 2000), IEEE Press, pp. 157-164 and Young et al. As an example of the confusion with common language, assume that a user wants to extract all records associated with two cities, Boston and New York. Under these circumstances, if the user relies on common language parlance, the user may logically request all records from "Boston AND New York," which produces a Boolean intersection of sets of records associated with these cities, and is likely to result in no records being returned, depending on the nature of the data in the database being searched. In contrast, the correct request would be a union operator using a Boolean search query of "Boston OR New York." However, the naive user may incorrectly believe that the "OR" means that only one of these cities would be considered.

Another difficulty a user may have is that in text queries, parentheses are used to establish precedence among the operators, which may be poorly understood by novice users, as discussed by Michard, "A New Database Query Language for Non-Professional Users: Design Principles and Ergonomic Evaluation," Behavioral and Information Technology, Vol. 13 (1982), pp. 279-288, and Young et al., cited above. Nested parentheses are a particular source of difficulty for many users, as also discussed by Michard. In particular, when there are many levels of nesting the user may get confused as to which two parentheses form the pair that delineate the level the user is interested in.

As discussed by Jones, "Dynamic Query Result Previews for a Digital Library," Proceedings of the 3$^{rd}$ ACM Conference on Digial Libraries (Pittsburgh, Pa., May 1998), ACM Press, pp. 291-292, and "Graphical Query Specification and Dynamic Result Previews for a Digital Library," Proceedings of the 11$^{th}$ Annual ACM Symposium on User Interface Software and Technology (San Francisco, Calif., November 1998), ACM Press, pp. 143-151, and Plaisant et al., "Interface and Data Architecture for Query Preview in Networked Information Systems," ACM Transactions on Information Systems, Vol. 17, No. 3 (July 1999), pp. 320-341, a graphical representation of the query can result in substantial benefits during the refinement phase of query building. Potential advantages include fewer zero-hit queries, reduced network activity due to the prevention of retrieval of undesired records, improved query comprehension, and better support for browsing within an unfamiliar database.

Query preview is available in prior prototypes that support dynamic querying, using direct manipulation to construct queries, as disclosed by Ahlberg et al., "Dynamic Queries for Information Exploration: An Implementation and Evaluation," Proceedings of ACM CHI '92, (1992), ACM Press, pp. 619-626, Malan et al., "Visual Query Tools for Uncertain Spatio-Temporal Data," Proceedings of the 9$^{th}$ ACM International Conference on Multimedia (Ottawa, Canada, September 2001), ACM Press, pp. 522-524, and Plaisant et al., "Dynamaps: Dynamic Queries on a Health Statistics Atlas," Proceedings of ACM CHI '94 (Boston, Mass., April 1994), ACM Press, pp. 439-440. However, query preview may add a significant amount of processing overhead.

Query formulations that include tabular layouts of cards are disclosed by Pane et al., "Improving User Performance on Boolean Queries" Proceedings of CHI 2000 Extended Abstracts (The Hague, Netherlands, April 2000). ACM Press, pp. 269-270, and "Tabular and Textual Methods for Selecting Objects from a Group," Proceedings of VL 2000: IEEE Int. Symposium on Visual Languages (Seattle, Wash., September 2000), IEEE Press, pp. 157-164. Similarly, boxes that may overlap in horizontal or vertical dimensions are used by Anick et al., "A Direct Manipulation Interface for Boolean Information Retrieval via Natural Language Query," Proceedings of ACM Special Interest Group on Information Retrieval (SIGIR) '90, ACM Press, pp. 135-150.

Young et al., "A Graphical Filter/Flow Representation of Boolean Queries: A Prototype Implementation and Evaluation," Journal of the American Society of Information Science, Vol. 44, No. 6 (1993), pp. 327-339, introduced a Filter/Flow model for query building to overcome issues related to the limited Boolean knowledge of end users. Young et al.'s prototype relied upon a graphical representation of parallel branching and constrictions in data flowing to represent OR's and AND's in a Boolean query.

FIG. 1 shows prior filter flow interface 100 according to Young et al. Filter flow interface 100 has filters 102, 104, 106, 108, and 110, and has dataflow lines 122, 124, 126, 128, and 130. The width of each of dataflow lines 122, 124, 126, 128, and 130 represents the amount of data retrieved after application of those of filters 102, 104, 106, 108, and 110 that precede that dataflow line. Filters 102, 104, 106, 108, and 110 filter the collection of data by limiting the total amount of data in the results as depicted by the dataflow lines 122, 124, 126, 128, and 130. As the data is filtered, the dataflow lines get narrower. An analogy can be made to dams on a river constricting the flow of the river and filters 102, 104, 106, 108, and 110 (analogous to the dams) constricting dataflow lines 122, 124, 126, 128, and 130 (analogous to the rivers) by limiting the amount of data remaining in the search results (analogous to the amount of water remaining in the river).

In FIG. 1, filters located on dataflow lines arranged parallel to one another are logically ORed with one another forming a union of the two sets of data, while filters located on dataflow lines that are serially connected are logically ANDed with one another forming the intersection of the two sets of data. In the example depicted in FIG. 1, the search query represented will find any document having a location of Georgia (filter 102, filtering dataflow line 122 to produce dataflow line 124) including either clerks (filter 104, filtering dataflow line 124 to produce dataflow line 126) with an income of $40,000 or more (filter 106, filtering dataflow line 126 to contribute to dataflow line 128), or all accountants and engineers (filter 108 also filtering dataflow line 124, but producing dataflow line 130) having Elizabeth as their manager (filter 110 filtering dataflow line 130 to also contribute to dataflow line 128). Dataflow line 128 that include the output of filter 110 ORed with the output of filter 106 as indicated by filters 106 and 110 being located on parallel paths including parallel dataflow lines 126 and 130.

Using Young et al.'s Filter/Flow model, users comprehended and constructed queries more accurately, compared to users of all text-based queries. Users also strongly preferred the graphical interface over the text query interface. However, the Filter/Flow model by Young et al. is limited in its flexibility and was not connected to a database.

SUMMARY OF THE INVENTION

The present condition builder provides several features that can each be used independently of one another or with any combination of the other features. Although many of the features of the present condition builder are motivated by the problems explained above, any individual feature may not address any of the problems discussed above or may only address one of the problems discussed above. Some of the problems discussed above may not be fully addressed by any of the features of the present condition builder.

A graphical condition builder is provided that presents a graphical representation of a search query. In an embodiment, a graphical and a numerical representation of expected sizes of results sets is provided simultaneously within the preview representation of a query's likely search results. In an embodiment, the condition builder provides a graphical representation of groups of filter objects, which can be used to affect the order of operations of the filter objects in a manner similar (although not necessarily identical) to parentheses within a Structured Query Language (SQL) clause. In an embodiment, at least some logical operations are automatically determined by the placement of an icon representing an object filter within a graphical representation of a query. In an embodiment, a graphical representation of a NOT operation is provided, where the NOT operation inverts one or more results sets. In an embodiment, a Boolean query is divided into steps and each step may contain multiple filter objects. Optionally, the steps can be individually enabled, disabled, or otherwise controlled. In an embodiment, the preview of the size of a results set is represented using graphical preview portions that narrow continuously. In an embodiment, the graphical preview portions have a shape that is suggestive of a funnel.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF SOME EXAMPLES OF THE INVENTION

Figure 1:
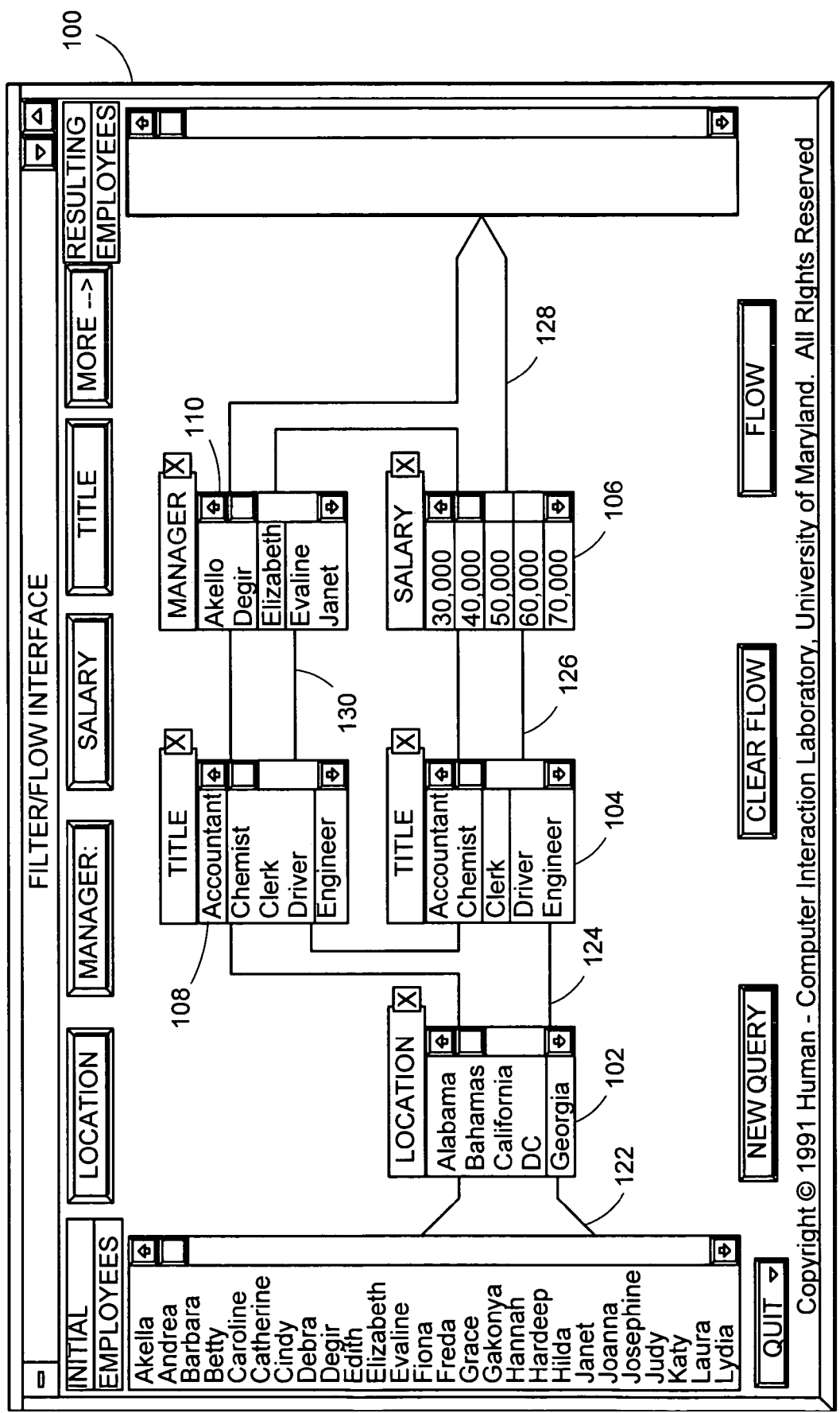
FIG. 1 shows a prior art search query interface, which was discussed above.

In general in this specification, the contents of each figure will be discussed by first briefly describing each labeled item, primarily to establish a list of each labeled feature of the figure, and then a more detailed description of the drawing will follow. Each of the figures is generally discussed in the order in which it is numbered. Although headings are provided, information related to a particular heading not found in the section having that heading may also be found elsewhere in the specification.

Overview of Graphical Condition Builder

Figure 2:
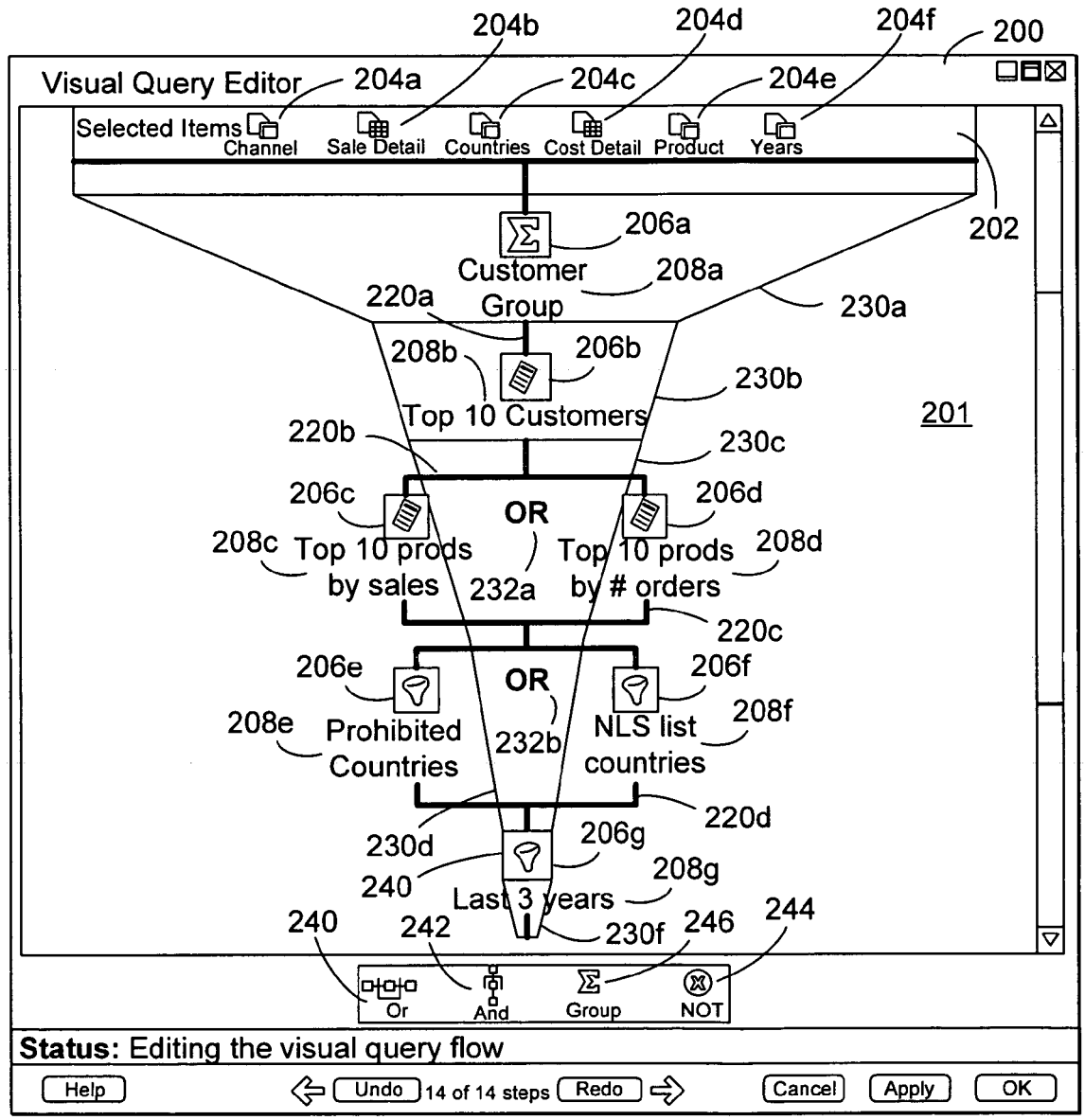
FIG. 2 shows an embodiment of a search query interface according to the invention.

FIG. 2 shows a graphical condition builder 200 having a canvas 201 and an item container 202, which includes source designators 204a-f. Source designators 204a-f identify the set of data against which the query is to be executed: In the present example, the query is to be executed against data from a database. Thus, source designators 204a-f represent a specific set of information from a specific set of tables within the database.

In FIG. 2, source designators 204b and 204d respectively represent Sale Details and Cost Details, which correspond to sets of data items from the database. On the other hand, source designators 204a, 204c, 204e and 204f respectively represent data about Channels, Countries, Products, and Years, which correspond to dimensions of the "Sales Details" and "Cost Details" data items. Each individual data item in the "Sales Details" data set and the "Cost Details" data set will be associated with a particular value for each dimension. Thus, as will be illustrated hereafter, dimensional source designators 204a, 204c, 204e, and 204f can be used for filtering, ordering or arranging the "Sales Details" and "Cost Details" data sets.

Graphical condition builder 200 also has filter icons 206a-g, which are joined to one another by dataflow lines 220a-g. Each of filter icon 206 represents a condition that affects which data is satisfied by the query. The data flow lines that flow down into a particular filter icon 206 represents the set of data items that would be returned by the elements of the query that precede the particular filter icon 206. Conversely, the data flow lines that flow down from the particular filter icon 206 represents the set of data items that would be returned by combining the condition that is represented by the particular filter icon 206 with those previous elements.

For example, the data flow line 220a that flows down into filter icon 206b represents the set of data items that would be returned by the condition associated with filter icon 206a. Conversely, the data flow line 220b that flows down from filter icon 206b represents the set of data that would be returned by combining the condition that is represented by the filter icon 206b with the condition represented by filter icon 206a.

Under each of filter icons 206a-g is one of descriptive titles 208a-g. Each of descriptive titles 208a-g indicates the condition that is associated with the filter icon 206a-g to which it corresponds. For example, descriptive title 208b is "Top 10 Customers", which indicates that the corresponding filter icon 206b represents a condition that limits the query to data items that are associated with the top 10 customers.

In the vicinity of each icon is one of graphical preview portions 230a-f. In the illustrated embodiment, each graphical preview portion is associated with a stage of the query, and has two lateral members. The relative distance between the tops of the lateral members reflects the relative quantity of data items that satisfy the query elements that are prior to (e.g. above) the stage. The relative distance between the bottoms of the lateral members reflects the relative quantity of data items that satisfy the query after the stage. For example, the distance between the tops of the lateral members of portion 230b represents the relative amount of data that would flow through data flow line 220a. On the other hand, the distance between the bottoms of the lateral members of portion 230b represents the relative amount of data that would flow through data flow line 220b.

Also included in the graphical condition builder are OR indicators 232a and b, logical operator buttons 240, 242 and 244, and group button 246. In alternative embodiments, condition builder 200 may not have all of the features listed above or otherwise associated with FIG. 2, and/or may have other features in addition to or instead of the features listed above or otherwise associated with FIG. 2.

Graphical condition builder 200 may be used in any context in which Boolean expressions are constructed or presented, such as in conjunction with a variety of search engines. There is virtually no limit to the type of search engine with which the graphical condition builder 200 may be used. For example, graphical condition builder 200 may be used in conjunction with search engines that run searches against tables in a database, web pages, and/or documents. Accordingly, the term "item" will be used for the basic unit of information for which a searched is being performed. Also, although commonly one speaks of the number of "hits" found by a search, this application refers to the number of items found in a search, which is to be understood to mean the same thing.

In graphical condition builder 200, the search query is constructed graphically on canvas 201. As mentioned above, source indicators 204a-f generally represent the categories of information from which the query is to retrieve data from a source. For example, the source may be a database, and source indicators 202a-f may represent specific tables, or specific columns from tables, within the database, from which data is to be extracted.

The collection of source objects (e.g., source designators 204a-f) within item container 202 effectively represents the initial scope of a query. Subsequent condition filters may apply to all objects (e.g., source designators 204a-f) in item container 202, as in a relational database, or may only apply to one dimensional objects, as in a multidimensional (OLAP) database. The initial scope of analysis can be broadened or narrowed by selecting and highlighting target objects (e.g., source designators 204a-f) within the item container 202.

The filter objects are represented by filter icons 206a-g. The filter objects represent filters that restrict which information is to be extracted from the source. The filter objects associated with filter icons 206a-g may represent restrictions on one or more of the source designators 204a-f in item container 202. For example, source designator 204(e) is products, and filter icon 206(d) filters all but the top 10 products (where the products are ranked based on the number of orders).

Similar to filter flow interface 100 (FIG. 1) filters associated with those of filter icons 206a-g that are located along those of dataflow lines 220a-d that are connected serially are being ANDed with one another. In the embodiment depicted in FIG. 2, the flow is from the top of canvas 201 towards the bottom of canvas 201, because it conforms with an intuitive notion of water flowing from high places to low places. However, in alternate embodiments the flow may run from bottom to top, left to right, right to left, diagonally, or any other direction. The conditions associated with those of filter icons 206a-g that are located on those of dataflow lines 220a-d that are parallel to one another are ORed with one another. The OR operation is additionally indicated by OR indicators 232a and b.

"AND" and "OR" Indicators

A user interface mechanism is provided that allows filter icons to be created by selecting a source designator 204 from item container 202 and dragging and dropping the icon onto a desired position on the canvas 201. The user can specify and/or modify the condition for the filter either before or after dragging it to this location. For example, filter icon 206g can be created by dragging the source designator 204f for "Years" from container 202, and then modifying the condition to specify the condition "Last 3 Years".

According to one embodiment, the position at which a filter is placed determines how the corresponding condition is combined with the already-specified conditions of the query. For example, in one embodiment, if a filter icon is placed horizontally adjacent to one or more existing icons, then the condition associated with the filter icon is ORed with the conditions of the horizontally adjacent icons. On the other hand, if a filter icon is placed above or below existing filter icons, then the condition associated with the filter icons is ANDed with the conditions associated with the other icons. Temporary ghost image lines are observable during the process of dragging a condition, to allow the user to understand whether the condition will be ANDed or ORed if dropped at a specific location.

Once placed, a user interface mechanism is provided that allows filter icons 206a-g to be moved from their present location by dragging and dropping them to change the type of operation being performed between the filters associated with icons 204a-f and thereby change the query. In an embodiment, as filter icons 206a-g are being dragged on canvas 201, a ghost image appears displaying either an AND indicator or an OR indicator, depending upon whether the icons are vertically aligned (one above the other) or horizontally aligned (side by side). In an embodiment, the AND indicators only appear while icons are in the process of being moved, but not after they have been dropped into a position.

For example, if filter icons 206e and 206f are moved so that they are vertically aligned, then the dataflow lines 220c and 220d automatically rearrange themselves to show filter icons 206e and 206f being located along dataflow lines connected serially, and OR indicator 232b automatically disappears. Similarly, were filter icons 206a and 206b moved so that they are located to the sides of one another, then dataflow lines 220a and 220b are automatically rearranged to show filter icons 206a and 206b being located on parallel dataflow lines, and an OR indicator automatically appears, and the search query is altered so that the conditions associated with filter icons 206a and 206b are ORed. The ability to dynamically preview results of a change in the search query by moving search query components on canvas 201 facilitates the user iteratively altering the search until the number of items or hits found by the search query is within a desired range.

In alternative embodiments, the AND indicator may also appear after the icons are dropped into position, the OR indicator may not appear after the icon is dropped, the AND and/or the OR indicator may not appear while the icons are being moved, and/or there may not be AND and/or OR indicators.

In the example depicted in FIG. 2, the logical operations of AND and OR can also be added using logical operator buttons 240 and 242. For example, graphical query operator 200 may support construction or altering a search query by (1) selecting a location within graphical condition builder 200, (2) selecting the icons representing filters already in the query (on canvas 201) or by selecting two of source designators 204a-f between which the operators will be applied, and then (3) selecting the appropriate one of logical operator buttons 240 and 242. In response two icons will be automatically placed on canvas 201 along the dataflow line at the location selected either in parallel or in series according to the logical operator selected. Alternatively, the new icons may be placed on canvas 201 at a default location, such as at the end of the search query diagram.

Not Operator

The logical NOT operation is also supported by graphical condition builder 200. The logical NOT inverts the results so that the items that would have been included without the NOT operator are excluded from the search results, and the items that would have been excluded without the NOT operator are included within the search results. In an embodiment, the depiction of an X on a dataflow line may indicate the performance of a logical NOT operation. In alternative embodiments, the NOT operation may be indicated by placing the indicia "NOT" in addition to or instead of the X on the dataflow line. The NOT operator may be added to a search using the logical operator button 244. For example, a NOT operator may be added by selecting operator button 244 and then selecting the location within the graphic illustration of the search query to insert the not operator. According to one embodiment, a user can drag an icon representing the NOT operator over the canvas, and drop the icon at the desired location within the graphical representation of the query.

Graphical Preview Portions

Graphical preview portions 230a-f are visually distinct graphical preview indications that show how the collection of items found is narrowed (or widened, as may be the case when a NOT operator is placed on an existing portion of a query) by the application of each filter object. As mentioned above, the widths of graphical preview portions 230a-g are proportional to the number of documents expected to be in the results set at the corresponding point in the query flow, and graphical preview portions 230a-g may have shapes suggestive of funnels or cones, for example. The top width of each of graphical preview portions 230a-f represents the size of the results set being filtered by the associated filter object prior to applying the filter associated with the filter object. The bottom width of each of graphical preview portions 230a-f represents the expected size of the results set of the associated filter object after being filtered.

In contrast to the widths of dataflow lines 122-130 (FIG. 1), the widths of graphical preview portions 230a-f typically narrow continuously. Although in the embodiment depicted in FIG. 2 the dataflow lines all have the same width, dataflow lines of varying widths that depend on the number of hits or items in a local results set may be used in combination with or instead of graphical preview portions 230a-f.

In the embodiment shown in FIG. 2, the walls of graphical preview portions 230a-f are straight, and there is an abrupt change in the slope of the side walls or at least a change that is not graphically smooth at the transition between graphical preview portions 230a-f. Additionally, there are lines demarking the border between graphical preview regions. These features facilitate distinguishing the transition between graphical preview regions 230a-f. However, in alternative embodiments the side walls and/or boundary demarcation lines may be curved (concave and/or convex), the slopes of the side walls at the transitions between graphical preview portions 230a-f may be graphically smooth (e.g., at the transitions, the slopes may appear to be mathematically continuous and the walls may appear mathematically smooth), and/or there may not be any lines demarking the borders between adjacent graphical preview portions 230a-f.

Order Dependent Filter Objects

Having a direction of flow indicated by dataflow lines 220a-g facilitates having order dependent filter objects, such as the top 5% of the documents previously found. In FIG. 2 the filter objects associated with filter icons 206b-d are order dependent as indicated by descriptive titles 208b-d, having titles "Top 10 Customers," "Top 10 prods by sales," "Top 10 prods by # orders" respectively. For example, in an extreme case, the top 10 customers may not purchase any of the top ten products by sales. Thus, if the top 10 products by sales filter, the filter associated with filter icon 206b is applied first, and the top ten customers filter, the filter associated with filter icon 206c, is applied second the result will be 0 products. In contrast, the top ten products by sales of the products bought by the top ten customers may be 90% of the top ten customers' purchases, and the top ten customers' purchases may be 20% of all products sold. Consequently, reversing the order of the filters associated with filter icons 206b and 206c, and applying the top ten customers filter first (the filter associated with filter icon 206c) and then applying the top ten products by sales filter (the filter associated with filter icon 206b) may result in a item including 18% of the products sold. The effect of the ordering of the filters associated with filter icons 206b-d may be readily previewed by moving filter icons 206b-d on canvas 201 to have a different order in the dataflow.

Order dependence is often the result of the filter operation being performed on the previous result. In other words, the input to the filter is the results set obtained from the previously applied filter. In an embodiment, filter objects are included that have their input from the entire database prior to any filtering, and which are therefore order independent. For example, a filter may be included that for the top 10% of all sales, rather than the top 10% of the sales of the data set from the search results of the output of the previously applied filter.

Groups

Group button 246 is used to represent a group of filter objects as one filter object. Any portion of the search query having one incoming dataflow line and one out going dataflow line can be grouped together into a single filter represented by a single icon. Filter icon 206a represents such a group filter object. In alternative embodiments, each icon representing a group filter object may have multiple input and/or output dataflow lines.

In an embodiment, the user can select multiple icons and then click on group button 246 to create an icon representing the group of filters corresponding to the icons selected. In an embodiment, selecting group button 246 may create an empty group icon within which icons representing filter objects may be placed (by dragging and dropping). Clicking on filter icon 206a opens the group icon, allowing the user to view and/or edit the group represented by filter icon 206a.

After a portion of the search query (which may involve many filters and operators) has been established as a group, the icon that represents the group may be manipulated (e.g. dragged and dropped to other locations within the query) to move the entire portion of the query as a single unit.

In an embodiment, the user can select a set of discontiguous filter icons (representing objects) before clicking on group button 246 to create a group. In this case, two or more objects having their filter icons vertically located at the same level on the dataflow will be ORed within the group. Similarly, two or more selected filter icons that are horizontally co-located, though vertically separated, on the dataflow will have their respective objects ANDed within the group. In an embodiment, when situations arise where two or more objects have their filter icons located so that it is ambiguous whether the user are intended them to be ANDed or ORed within the group, a preference will be given to ANDing the objects. In an alternative embodiment, a preference will be given to ORing the objects. Boolean representations within the group object that were not intended by the user can be easily remade, using existing UI rules for ANDing and ORing objects.

Numerical Preview Indications and More on Groups

Figure 3:
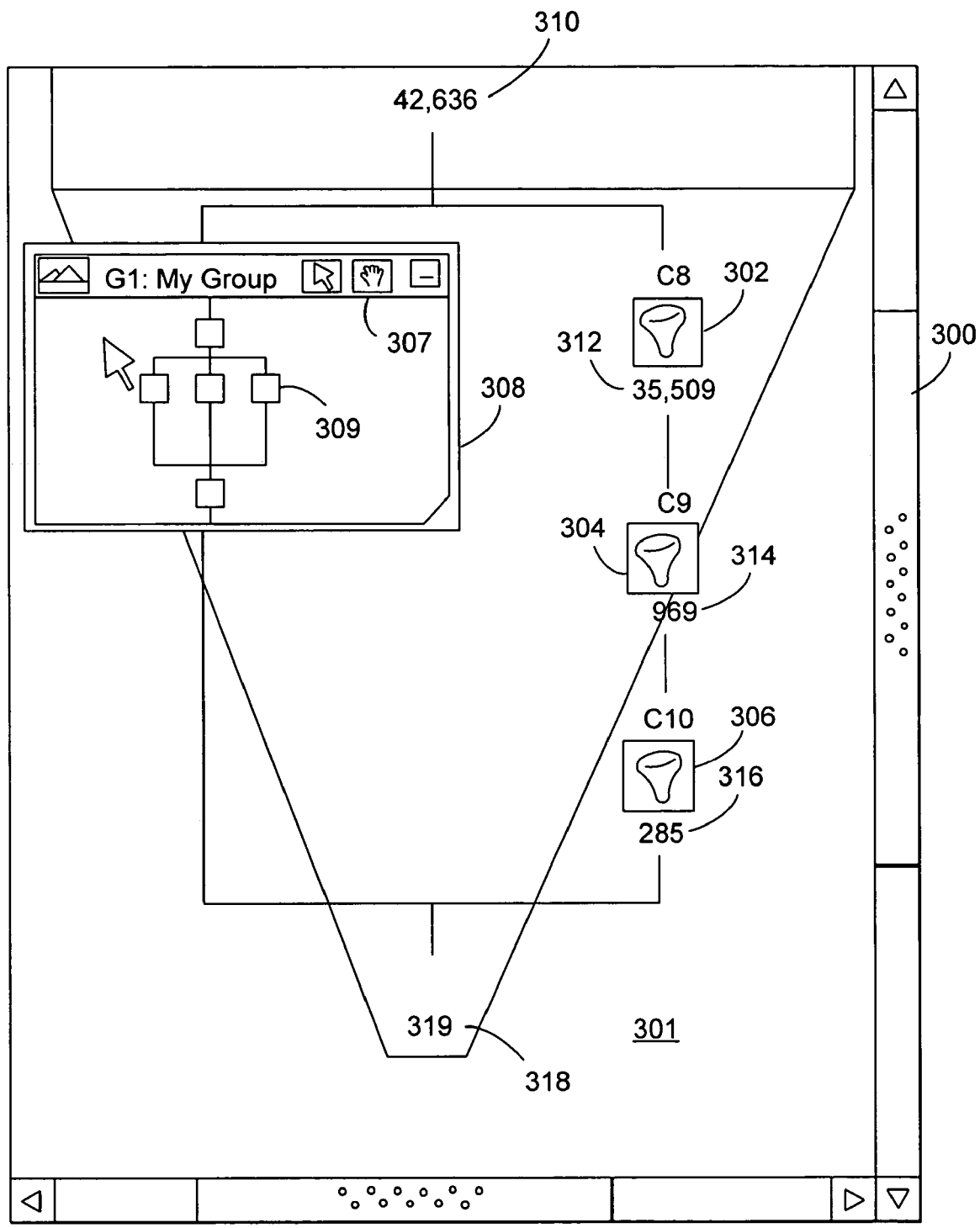
FIG. 3 shows a search query interface similar to that of FIG. 2 having a group box that is opened.

FIG. 3 shows another graphical query window 300 having a canvas 301, icons 302, 304, and 306, a hand button 307, a group object window 308, a representation of a group of objects 309, and numerical preview indicators 310, 312, 314, 316, and 318.

Group object window 308 represents an open state of a group object. Double-clicking on a group icon causes the display of the group icon to be replaced with group object window 308. Group object window 308 includes the representation of the portion of the query that has been established as part of the group, which may include group of objects 309 including filter objects, operator icons.

The group of objects 309 contained within group object window 308 may even include one of more other group objects. Similar to parentheses in the text-based representation of Boolean expressions, group objects allow the user to organize the filter objects of a query in a manner according to the user's desires, so that it is easier for the user to gain an overview of a complex query. However, in contrast to parentheses, the groupings formed by group objects are easy to visualize, and do not have the confusions associated with parentheses, especially nested parentheses.

In an embodiment, group objects may affect the order in which operations are performed in a similar fashion as parentheses affect the order in which operations are performed within a logical expression. Specifically, the objects within the group are evaluated and then the group object is applied after filter objects earlier in the query flow have been applied. By providing group objects that affect the order of evaluation of filter objects, the confusions associated with parentheses can be avoided while retaining ordering capabilities similar to parentheses. However, in alternative embodiments, the group object does not affect the order of evaluation of the filter objects contained within.

Numerical preview indicators 310, 312, 314, 316, and 318 indicate the number of items expected to be found at each point during the query after applying the preceding filter objects. For example, numerical preview indicator 310 shows that there are 42,636 items that have been found before applying the filter objects associated with icons 302, 304, 306 and group object window 308. Numerical preview indicator 312 shows that after applying the filter of object 302, there are only 35,509 items or hits expected to be found in the pool of data, while numerical preview indicator 318 shows that after applying the series of filter objects associated with icons 302, 304 and 306 and ORing them with the group of filter objects associated with group object window 308, there are only 319 items that are expected to be found by the search query.

Numerical preview indicators 310, 312, 314, 316, and 318 may be displayed prior to performing a search giving an estimate of the number of items or hits that will be found. Numerical preview indicators 310, 312, 314, 316, and 318 clarify the effects of AND and OR operators, thereby reducing the user's need to have a prior knowledge of Boolean logic.

Numerical preview results can be obtained by at least three alternative methods. (1) Interim database queries can quickly return a row count for small, and/or non-complex databases. (2) Algorithms have been developed to estimate the size of returned query results from a large and/or complex database, without executing a time-consuming query. These rely upon statistics obtained from metadata housed within the database. (3) Algorithms have been developed to provide very rough indications of returned results, by using only the combination of AND and OR operators combined with the initial size of the database, without executing actual queries.

Figure 4:
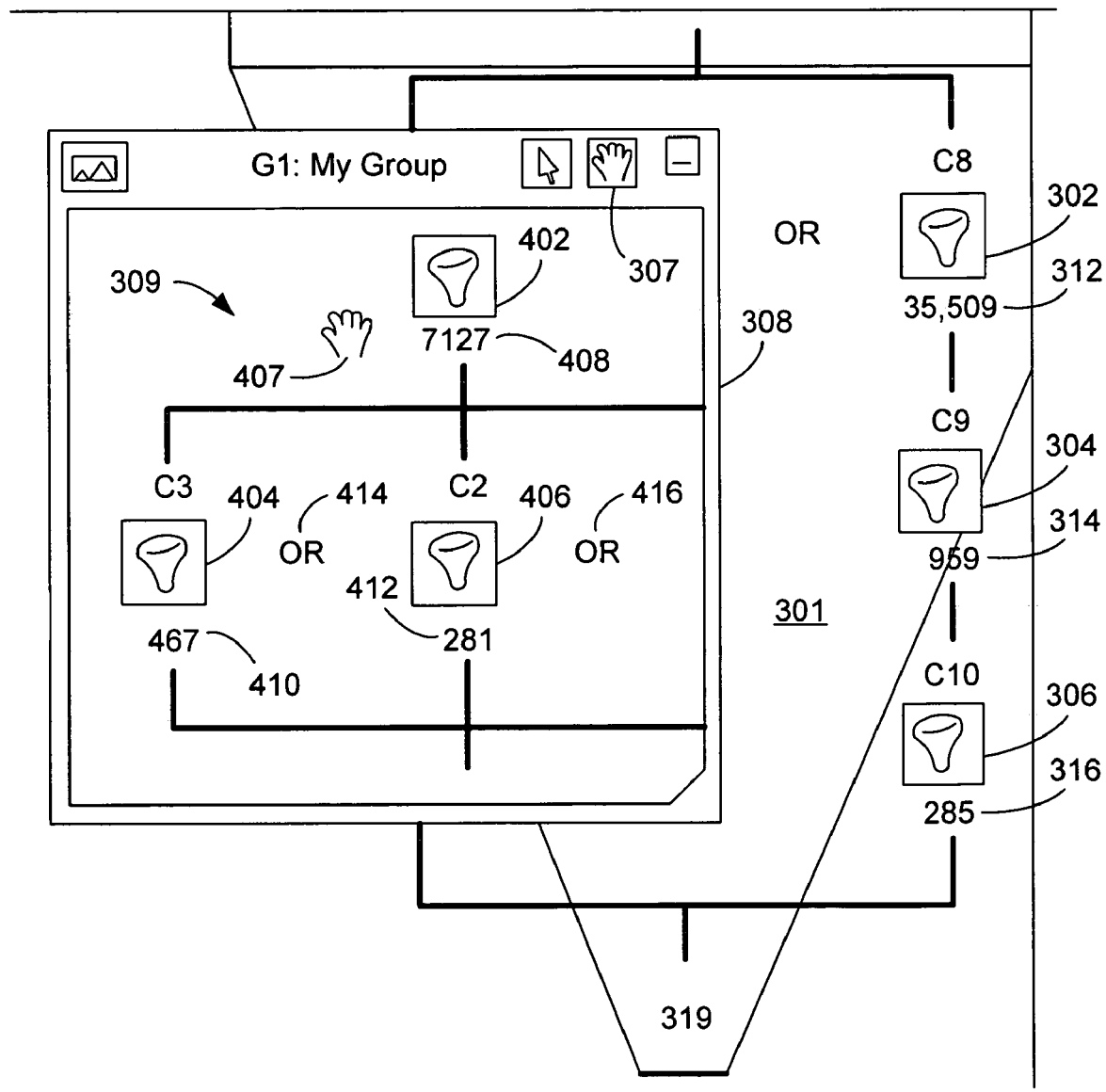
FIG. 4 shows the group box of FIG. 3 with its group of filter objects selectable for editing.

FIG. 4 shows graphical query window 300 with the representation of the group of objects 309 expanded within group object window 308. Each of the objects within group 309 is represented by a separate icon, including filter icons 402, 404, and 406, numerical preview indicators 408, 410 and 412, dataflow lines 414 and 416, and OR indicators 418 and 420. Similar to the larger query representation on the canvas, the various objects in the group of objects 309 are connected by dataflow lines. In an embodiment, each filter object can be selected and edited by selecting its corresponding icon 402, 404, and 406 just as if they were not included within group object window 308. For example, numerical preview indicators 408, 410 and 412, dataflow lines 414 and 416, and OR indicators 418 and 420 are visible and behave no differently than if they were located directly on canvas 301.

In the embodiment depicted in FIG. 4, hand button 307 may be used to cause hand 407 to appear. Hand 407 is used to move the image within group object window 308 to see different parts of the group of objects 309, should the group of objects 309 be too large to fit within the window of group object window 308. In an alternative embodiment, the window of group object 308 includes horizontal and/or vertical scroll bars, and can be scrolled in order to see different parts of the group. An embodiment includes a user interface mechanism that allows a user to scroll through group object window 308 using directional keys, a mouse, track ball, touch sensitive pad, or other such navigational or cursor control device. Other embodiments may include any combination of hand 307, scroll bars, or any other navigational software or hardware may be available for the user.

In an embodiment, objects within a group container can be viewed at one of at least two zoom levels, as controlled by a magnifying glass icon on the opened group UI (group object window 308 of group of objects 309), for example. At one or more of the zoomed-in levels, objects (as represented by filter icons such as filter icons 402, 404, and 406) within group object window 308 appear at the same size and resolution as filter objects 302, 304, and 306 appear on the dataflow and/or canvas 301 of query editor window 300. Only a subset of filter icons representing objects contained within group object window 308 will normally appear when viewed at a zoomed-in level as depicted in FIG. 4, for large sets of grouped objects. At the zoomed-out level, all filter icons representing objects of group of objects 309 within the group container appear within group object window 308 as depicted in FIG. 3, but at a relatively coarse level of detail that does not display object labels. In an embodiment, in the zoomed-out state of FIG. 3, however, lines still indicate Boolean connections between objects, and objects can still be selected, dragged, and dropped in a similar way as objects in the parent query editor window. In this manner, users can explore the contents of a large group at a high-level view, then zoom-in to work with specific contained objects.

In an embodiment, group containers can contain other groups, as well as condition filters. The hierarchical containment of groups can provide a powerful and flexible graphical analogy for nested sub-queries, much like nested parentheses within SQL statements.

Query Steps

Figure 5:
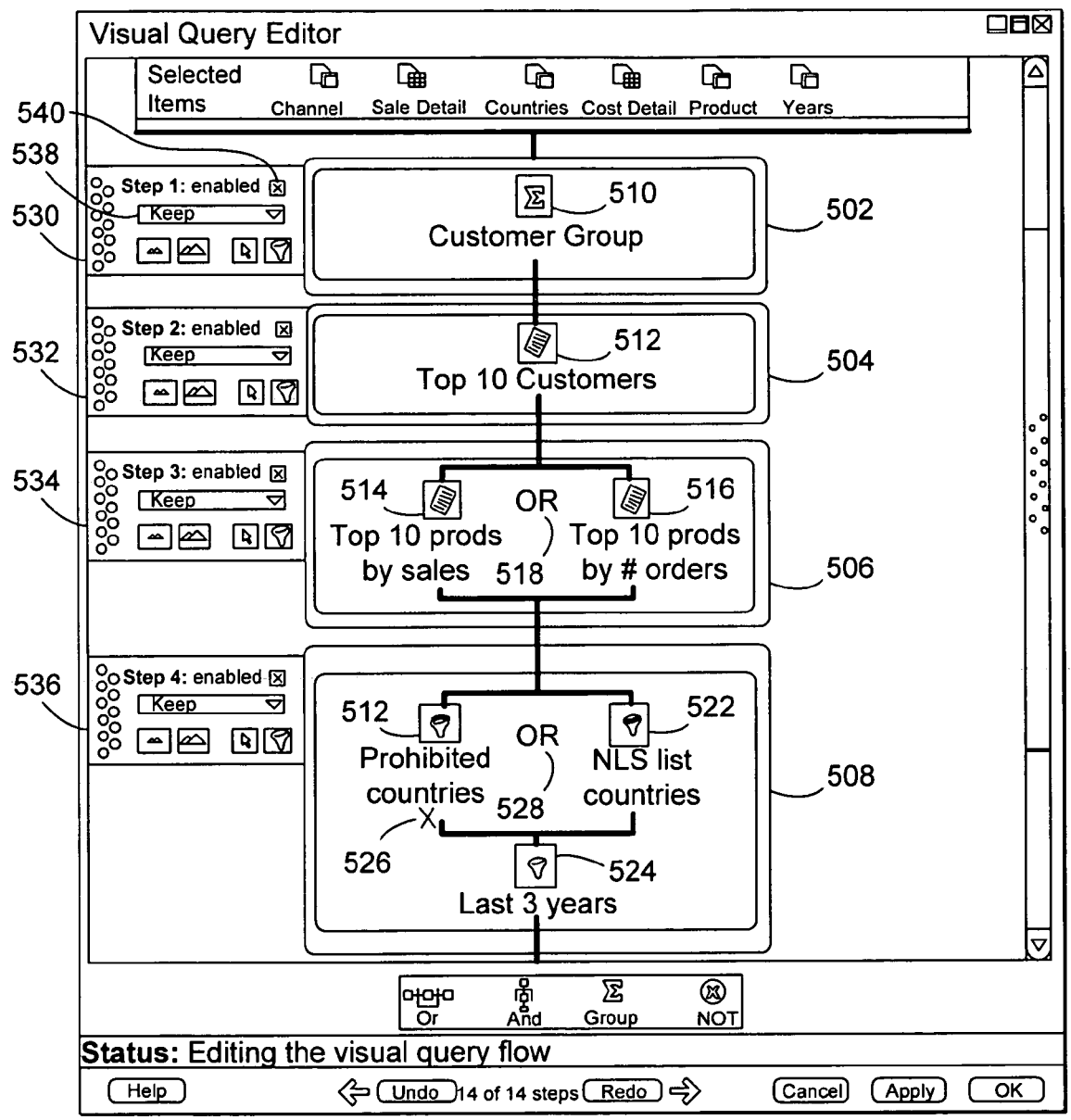
FIG. 5 shows an embodiment of the invention in which the search query is divided into query steps.

FIG. 5 shows query "steps" 502, 504, 506, and 508. In this context, a "step" corresponds to a stage of the query. In the example illustrated in FIG. 5, the query is divided into four stages, each of which is associated with a step. Within query step 502 is group icon 510, and within query step 504 is icon 512. Within query step 506 are icons 514 and 516, and OR indicator 518. Within query step 508 are icons 512, 522, and 524, NOT indicator 526, and OR indicator 528. Each of query steps 502, 504, 506, and 508 is associated with one of tabs 530, 532, 534, or 536. Tab 530 includes window 538 and enable button 540. Although not labeled or discussed further, each of tabs 532, 534, and 536 also have a window and enable button that function similar to window 538 and enable button 540. In alternative embodiments, condition builder 500 may not have all of the features listed above or otherwise associated with FIG. 5, and/or may have other features in addition to or instead of the features listed above or otherwise associated with FIG. 5. For example, step containers could be represented as shaded areas underlying specific portions of a query.

Query steps 502, 504, 506, and 508 act as containers for some portion of the query. Similar to a group, in an embodiment, there is one input dataflow line and one output dataflow line for each one of query steps 502, 504, 506, and 508. However, in alternative embodiments there may be multiple input and/or output dataflow lines for any or all steps.

Each query steps 502, 504, 506, and 508 has various attributes and/or properties associated with it. Some of the attributes associated with a step are whether the step is enabled or disabled, the order in which the step appears in the search, and the manner in which the search results of the step are combined with the rest of the search query. Many of the attributes and/or properties of query steps 502, 504, 506, and 508 are indicated on their respective tabs 530, 532, 534, and 536, which serve as a user interface mechanism for viewing and manipulating these attributes and/or properties.

Regarding the attribute or property of the order in the search, each of query steps 502, 504, 506, and 508 are numbered 1, 2, 3, and 4, as indicated on tabs 530, 532, 534, and 536, respectively, to indicate the order in which their associated conditions are applied relative to one another. The order of query steps 502, 504, 506, and 508 may be changed by dragging one of query steps 502, 504, 506, and 508 to a different position within the sequence of query steps automatically causing a change in the values of numbers 1, 2, 3, and 4 to reflect the new order.

In alternative embodiments, in addition to or instead of dragging and dropping query steps 502, 504, 506, and 508, the order of query steps 502, 504, 506, and 508 may be changed by changing the values of their associated numbers. In an embodiment, changing the numbers 1, 2, 3, and 4, may automatically change the position of the their associated query steps 502, 504, 506, and 508. Alternatively, changing the values of numbers 1, 2, 3, and 4 may only change the order in which the steps are applied but not their physical location on the screen. There is no limit to the number of objects that can be placed, and the complexity of the portion of the search query within each of query steps 502, 504, 506, and 508. In an embodiment, steps may be mixed with Boolean logic not included in any step. For example, steps may be added to the end or anywhere else in the search query of FIG. 2. In an embodiment, a new step may be automatically added to the end of a search query such as that of FIG. 2 or FIG. 5.

Regarding the attribute or property of how the search results of the step are combined with the rest of the search, a window may be provided for selecting a method of combination. Using tab 530 as an example, window 538 indicates an attribute or property of how query step 502 is applied. In an embodiment, window 538 includes a pull down menu with choices, such as "keep," "add," and "remove," which determine whether the local results set of query step 502 (found as a result of applying only the filter associated with icon 510 regardless of any prior steps in the query flow) are the only items or hits kept, added to the global results set, or removed from the global results set, respectively. For example, if window 538 is used to select "keep," then the search results from step 502 are kept and the only records in the data set are those of the customer group of group icon 510, which is the same data set as if the filter associated with icon 510 were applied without being included in a query step. If the window 538 is used to select "remove," then the result of applying the filter associated with icon 510 is removed from the input data set, which in the case of step 502 the input data set is the entire original dataset. Thus, the output of step 502 is the entire database with customer group associated with group icon 510 removed. If the window 538 is used to select "add" then the customer group associated with group icon 510 is added to the input of query step 502. However, since the customer group associated with group icon 510 was already part of the original dataset, the output of step 502 is the entire original dataset. However, were the filter associated with icon 512 the top 10 customers of the entire original dataset, and were step 502 set to "keep" and step 504 set to "add," then the output of step 504 would be the union of the customer group associated with group icon 510 and the top 10 customers of the entire data set. This allows a user ignorant of Boolean logic to perform a search without learning Boolean logic. In an alternative embodiment, the steps are combined with the rest of the query using or with other steps using the Boolean logic within the step.

In the illustrated embodiment, each step also includes an "enable" attribute or property that a user can turn ON or OFF by interacting with an enable icon 540. When the enable attribute of a step is set to ON, the step (with its enclosed objects) is enabled. Conversely, when the enable attribute is OFF, the step is disabled.

A query having a disabled query step is equivalent to the same query with all of the Boolean logic associated with the step having been removed. For example, were step 502 disabled by selecting and thereby toggling the enable icon 540, then the output of step 502 would be the same as its input, which is the entire original dataset. Consequently, the input to step 504 would also be the entire original dataset. The disabled query step (e.g., query step 502), nonetheless, still physically appears in the query flow, so that the query step can be enabled without recreating it. The capability of being able to enable and disable individual query steps especially in combination with the numerical preview indicators (shown in FIGS. 3 and 4) allows the user greater flexibility in comparing the affects of each query step on the results of the search query before performing the search. In the embodiment depicted in FIG. 5, both query steps and group objects are available to the user. However, in alternative embodiments, query steps are provided as a replacement to group objects. Although not illustrated, graphical preview sections may also be used in conjunction with the embodiment of FIG. 5. In an embodiment, steps may contain groups and condition filters, but may not contain other steps. In an alternative embodiment, steps may be nested within other steps. In an alternative embodiment, steps may also contain parts of other steps.

User Interfaces

Figure 6:
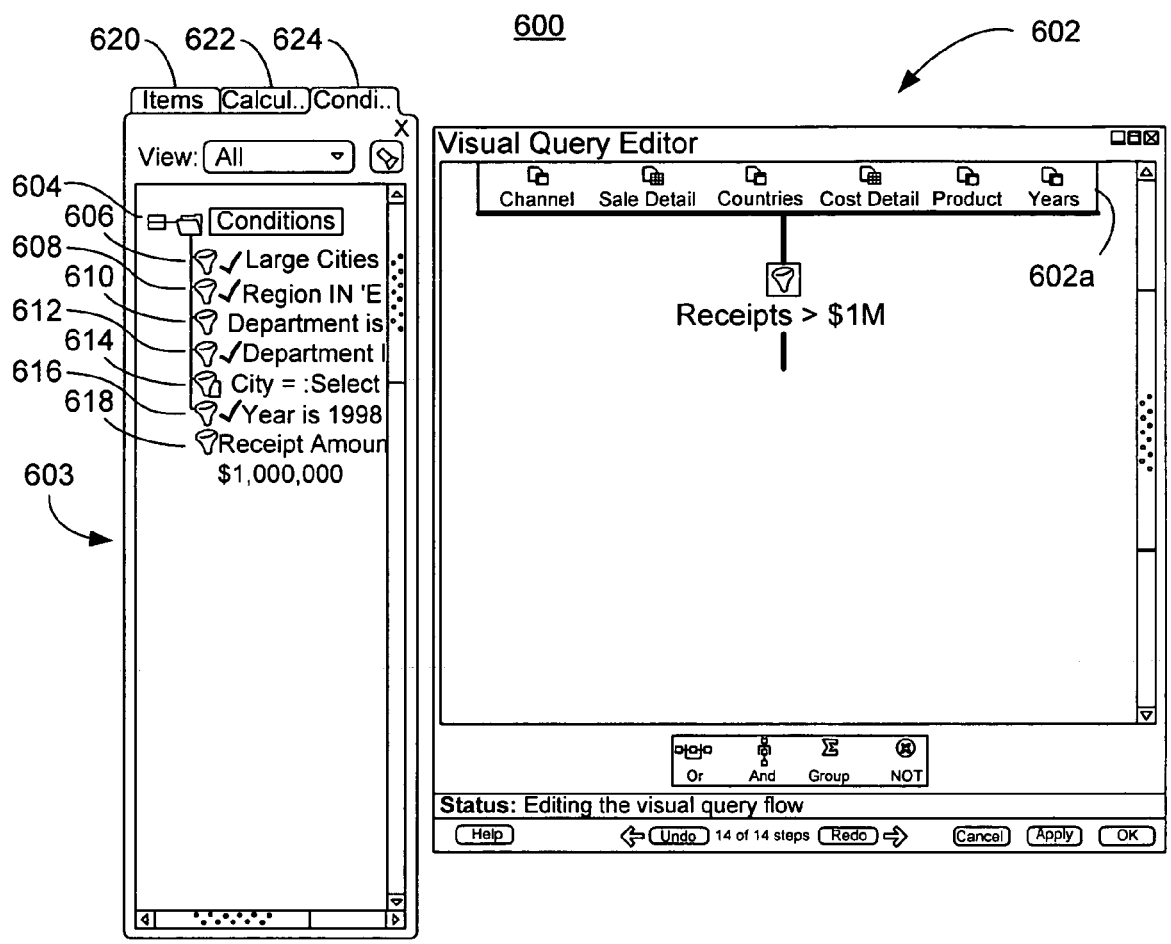
FIG. 6 shows an embodiment of a user interface for entering the search query.

FIG. 6 shows a user interface 600 having a query flow editor 602 for arranging a search query, an item container 602a having a list of information against which the query is to be executed, an item navigator 603 for selecting items and conditions having conditions folder 604 including conditions 606-618, an item tab 620 having a list of items that can be selected, a conditions tab 624 for editing the conditions specified in each filter, and an "other" tab 622. In alternative embodiments, user interface 600 may not have all of the features listed above or otherwise associated with FIG. 6, and/or may have other features in addition to or instead of the features listed above or otherwise associated with FIG. 6.

Query flow window 602 is used for graphically constructing a search query. Query flow window 602 may include any mixture of features of any combination of query flow editors 200, 300, and 500 of FIGS. 2-5 in which the search is visually depicted and can be constructed. In the example of FIG. 6, conditions tab 624 is selected, and therefore conditions folder 604 is displayed. Each of conditions 606-618 corresponds to a different filter condition. In an embodiment, graphical condition builder 600 supports clicking on an icon associated with one of conditions 606-618, and dragging and dropping the selected one of conditions 606-618 onto canvas 602 to construct a search query. Graphical condition builder 600 supports editing the conditions associated with an icon representing a filter object already on canvas 602 using the corresponding condition in condition folder 604. Item tab 620 may be used for choosing the set of selected items within item container 602a and/or conditions folder 604. Other tabs, such as other tab 622 may be used for opening other folders and/or for performing other database operations. Although not illustrated, graphical preview sections may also be used in conjunction with the embodiment of FIG. 6.

Figure 7:
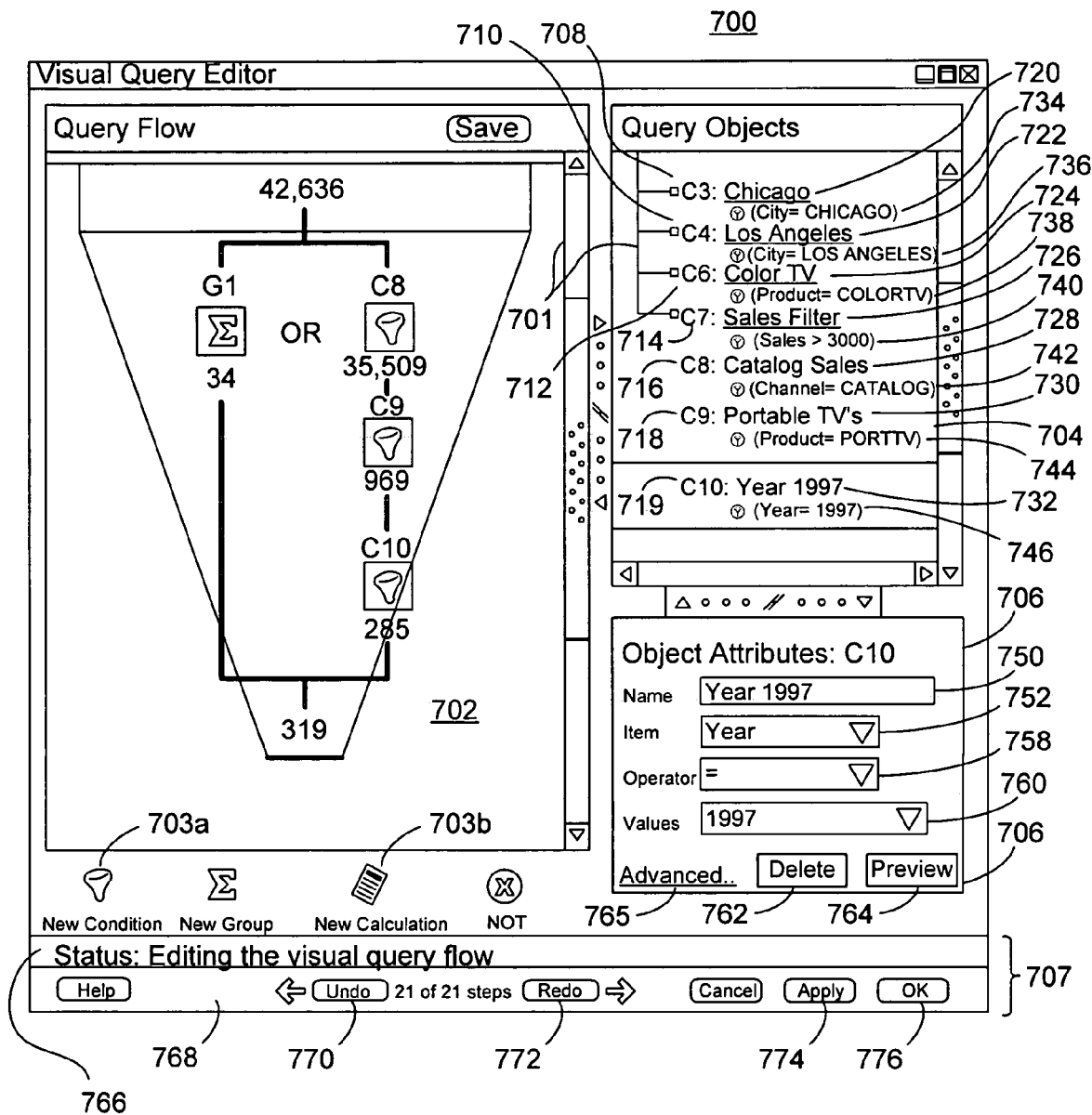
FIG. 7 shows a second embodiment of the user interface.

FIG. 7 shows an alternative user interface 700 having a query flow pane 702, query objects pane 704, object attributes pane 706, and status and control pane 707. Query flow pane 702 includes new condition button 703a and calculation button 703b. Query objects pane 704 includes tree 705 and a list of query objects 708, 710, 712, 714, 716 and 719, having names 720, 722, 724, 726, 728, 730, and 732, and filter conditions 734, 736, 738, 740, 742, 744 and 746, respectively. The object attributes pane 706 includes a name box 750, an item navigator 752, an operator box 758, a values box 760, a delete button 762, a preview button 764, and an advance link 765. The status and control pane 707 includes a status line 766, a control bar 768 including undo button 770, redo button 772, apply button 774, and OK button 776. In alternative embodiments, user interface 700 may not have all of the features listed above or otherwise associated with FIG. 7, and/or may have other features in addition to or instead of the features listed above or otherwise associated with FIG. 7.

Query flow pane 702 is used for graphically constructing a search query. Similar to query flow editor 602, query flow pane 702 may include any combination of features of any combination of query flow editors 200, 300, and 500 of FIGS. 2-5 in which the search is visually depicted and can be constructed, for example. New condition button 703a may be used to add a new query object to the query of query flow 702. In an embodiment, the new query object is automatically added to the bottom of the query flow depicted in query flow pane 702. Calculation button 703b is equivalent to calculation tab 622 and has the same function.

In an embodiment, each of the filter objects corresponding to the icons of query flow window 702 is listed in query objects pane 704. The query objects pane 704 may also contain query objects that are not included in the query depicted in query flow pane 702. New condition button 703a may also add the new query object (that was added to query flow pane 702) to query objects pane 704. Alternatively, new condition button 703a may only add the new query object to query flow pane 702, or in another embodiment may only add the new query object to query objects pane 704. In the example of FIG. 7, query objects pane 704, query objects 708, 710, 712, and 714 are located on tree 705. However, query objects 716, 718, and 719 may be arranged in a tree structure. The tree structure may also reflect group objects. In other words, in an embodiment, a group object may be a branch on a tree, for example, and the filter objects contained within the group object will be placed as branches branching from the group object branch. In alternative embodiments, query objects pane 704 may list filter objects without showing any tree structure. Filter objects contained within a group object may only be visible if the group object is clicked on or in alternative embodiments may be visible next to the group object within which they are contained.

Object attribute pane 706 displays the attributes of the object selected in query objects pane 704. In the example of FIG. 7, query object C10 (719) is selected, and accordingly object attributes pane 706 displays the attribute of query object C10 (719). The attributes of the query object displayed in object attribute pane 706 can be edited using object attribute pane 706. For example, the name 732 can be changed using name box 750, the item being filtered can be changed using item navigator 752, the operator being used on the item can be changed using operator box 758, and the value can be changed using values box 760. In an embodiment, the name, item, and/or condition associated with a query object may be edited by clicking on it wherever it appears in user interface 700.

In an embodiment, objects may be deleted by (1) dragging them off their respective windows, or (2) through a right-click, context menu. Alternatively, a trash can or other icon may be provided as a delete object, which may be included in addition to or as an alternative to either or both of the above two methods of deleting a filter icon and its corresponding object. Additionally or alternatively delete button 762 may be used to delete an object from query objects pane 704 and/or query flow pane 702. Preview button 764 may be used to preview the expected affect resulting from the change in attributes performed using attributes pane 706. When preview button 764 is selected query flow pane 702 and query object pane 704 are updated. By providing preview button 764, the user is given control of when the preview is updated, thereby avoiding unwanted updates that might otherwise be performed before the user has changed all items desired, for example. A selection outside object attributes pane 706 may also trigger an update of query flow pane 702 and query object pane 704. Advanced link 765 allows the user to input complex Boolean expressions in the filter object of object attributes pane 702, thereby at least partially bypassing the use of graphical input in the query flow pane 702.

Control and status pane 707 may include various control functions and status indications. In the embodiment of FIG. 7, control and status pane 707, via status line 766, gives the status of the graphical condition builder 700. Some values of status line 766 may display may be "idle" or "editing query flow," for example. Control and status pane 707 may include control bar 768, which in the embodiment illustrated in FIG. 7 control bar 768 includes a variety of control buttons. However in alternative embodiments, control bar 768 may include a variety of different inputs means for entering or implementing control functions, such as control buttons, text windows, pull down menus, and/or dialog boxes. Undo button 770 of control bar 768 may be used to undo the last action such as the addition of a filter object to a query, while redo button 772 may be used to redo an undone action. Clicking on apply button 774 or OK button 776 causes a search to be performed.

Graphical condition builders 600 and 700 may also include an SQL dialog box that may be invoked from a window level menu item, for example.

Alternative Embodiment

Figure 8:
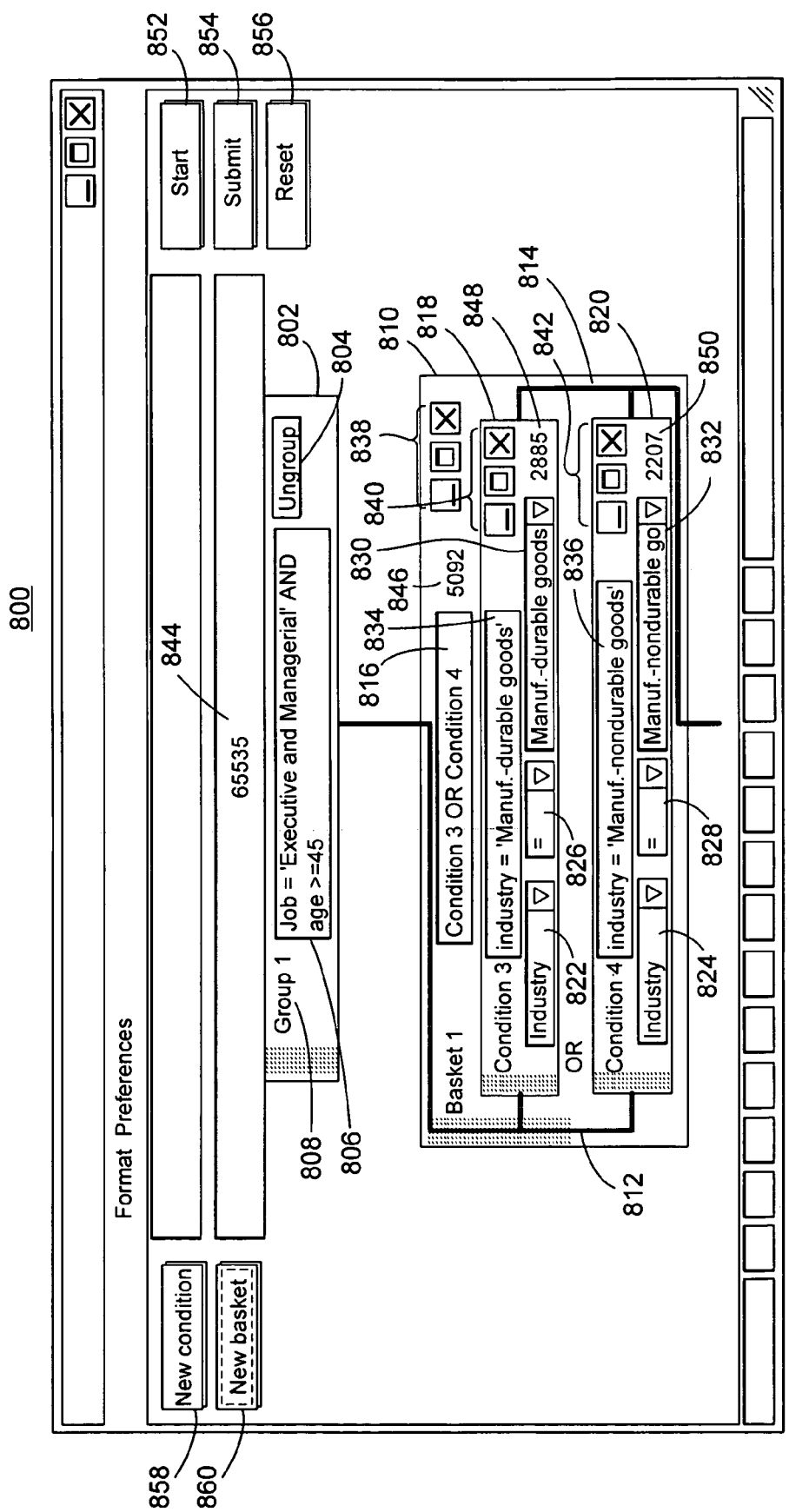
FIG. 8 shows an alternative embodiment of the search query interface.

FIG. 8 shows another embodiment of a graphical condition builder 800 in which the objects, instead of being represented by icons, are represented by tiled boxes 802 and 810, which are referred to herein as "baskets". The first tiled box 802 is a group item, which can be ungrouped using tab 804. The tiled boxes are linked via dataflow lines 812 and 814. The contents of the group are shown in window 806 and the name of the group is indicated in text indicator 808. The second titled box 810 includes a combined condition window 816, a first condition box 818 and a second condition box 820. Condition windows 818 and 820 include item windows 822 and 824, operator windows 826 and 828, value windows 830 and 832, and condition windows 834 and 836, respectively. Tiled box 810 and condition boxes 818 and 820 include minimize/maximize/close button sets 838, 840 and 842, respectively. Graphical condition builder 800 also includes numerical indicators 844, 846, 848, and 850. Graphical Condition builder 800 also may include start button 852, submit button 854, reset button 856, new condition button 858, and new basket button 860. In alternative embodiments, graphical condition builder 800 may not have all of the features listed above or otherwise associated with FIG. 8, and/or may have other features in addition to or instead of the features listed above or otherwise associated with FIG. 8.

Tiled box 810 is labeled Basket 1, and has flow lines 812 and 814 that indicate a parallel flow, which indicate that an OR operation is being performed between filter objects 818 and 820. Similar to the previous embodiments, the widths of dataflow lines 812 and 814 may be varied to reflect the relative sizes of the corresponding collection of documents resulting from the application of the filter objects earlier in the query.

Combined condition window 816 indicates that an OR operation is being performed between condition 3 and condition 4, which are the conditions associated with the filter objects associated with condition boxes 818 and 820. Conditions 3 and 4 are constructed by selecting an item on which the filter is being placed, which are listed in item windows 822 and 824, respectively. The operators being applied are chosen using operator windows 826 and 828, and the values associated with conditions 3 and 4 are selected using value windows 830 and 832, respectively. Although pull-down windows are illustrated as the input means for item windows 822 and 824, operator windows 826 and 828 and value windows 830 and 832, other input means may be used such as text entry windows.

Numerical preview indicators 844, 846, 848, and 850 indicate the number of items estimated to be found after the filter object they are associated with and any previous filter objects have been applied. Thus, numerical preview indicator 844 indicates the total number of items in the database prior to applying any filters. Numerical preview indicator 848 indicates the number of items expected to be found after the application of the filter objects associated with tiled box 802 and condition box 818. Numerical preview indicator 850 indicates the number of items expected to be found after the application of the filter objects associated with tiled box 802 and condition box 820. Numerical preview indicator 846 is the number of items expected to be found by taking the union of the items represented by numerical preview indicators 848 and 850.

The use of a basket to depict an OR operation emphasizes that the basket contains the union of the items of the two condition filters being ORed. The appearance of a filter object or a basket may differ depending upon whether the basket or filter object is connected to the query or under construction. For example the color of the basket or filter object may change once connected to the query.

Start button 852 is used to initiate the formation of a query or may be used to update the numerical preview indicators. Submit button 854 is used to submit a query and initiate a search after the formation of a query. Reset button 856 is used to clear the search query from the screen. New condition button 858 and new basket button 860 may be used for adding a new condition and new basket, respectively, and may initiate a series of dialog boxes or other actions and/or prompts facilitating the formation of a new condition and basket, respectively. Although not illustrated, graphical preview sections may also be used in conjunction with the embodiment of FIG. 8.

Multidimensional Databases

As mentioned above, graphical condition builders 200, 300, 500, and 800 (of FIGS. 2, 3, 5, and 8, respectively) and user interfaces 600 and 700 (of FIGS. 6 and 7, respectively) may be used in any context that requires the construction or display of a query composed of elements joined by Boolean logic, using the same graphical representation of the search query and the same GUIs. Such contexts may include, for example, queries to be run against relational databases, queries to be run against multidimensional databases, and any other forms of On-Line Transaction Processing (OLTP) or On-Line Analytical Processing (OLAP). Each dimension may be added into the search by selecting or double clicking a representation of that dimension, for example.

According to one embodiment, when the graphical condition builders, discussed above, is used with a multidimensional database, an estimate for the number of data items in the search results may be obtained by calculating the number of cells of each dimension that the search is being limited to. In other words, rather than providing a preview of the number of results found after each object filter, the number of cells found in each dimension is provided as an indication of the number items expected to be found by the search query, for example, even though many of these cells may not be populated.

For example, a search in a database of sales might be for sales having a date between Jan. 1, 2000 and Dec. 31, 2000 and at a location equal to "San Jose OR Boston" and by the top 10 customers by number of sales, where the search terms are entered in the order they are described in this sentence. Assume that the database extends from the end of the year 1992 to the end of the year 2002, has 30 cities as locations, and sells 15 different products. Assume also that the multidimensional database uses location, date, and product ID as dimensions, with cells for entries for each day of the year. The total number of cells in the database is 10(365)×30× 15=1624500, where the multiplicative factor of 10(365) is from the ten year span of the database, the 30 is from the 30 cities and the 15 is from the 15 products. Then the filter for the date limits the number of cells to $\frac{1}{10}^{th}$ the total number of cells (one year of the total 10 years). Consequently, after the date filter the number 162450 would be displayed as the estimate for the size of the dataset. The city filter further limits the search to 2 cities out of 30 or to $\frac{1}{15}^{th}$ the total number of cities. Consequently, the numerical preview displayed would be $\frac{1}{15}^{th}$ the number of cells resulting from the output of the date filter or 162450/15=10950. In another embodiment, these estimates are further improved by multiplying them by one or more further multiplicative factors. In an embodiment, a further multiplicative factor is the average density of the cells that are populated, where the average is based on all the cells in the multidimensional database. Alternatively, a distribution function giving the density of cells populating different regions of the database may be used to obtain the multiplicative factor.

In an embodiment there is also an estimate used to calculate the output of filters that do not pertain to any one dimension per se of the database, such as the top 10 customers filter of the above example. In another embodiment no numerical estimate is given after filters that do not pertain to any one dimension. In yet another embodiment, the numerical estimate given after a filter not pertaining to any one dimension is the same as the numerical estimate given before that filter, because the total number of cells that the search query spans is unchanged.

Hardware Overview

Figure 9:
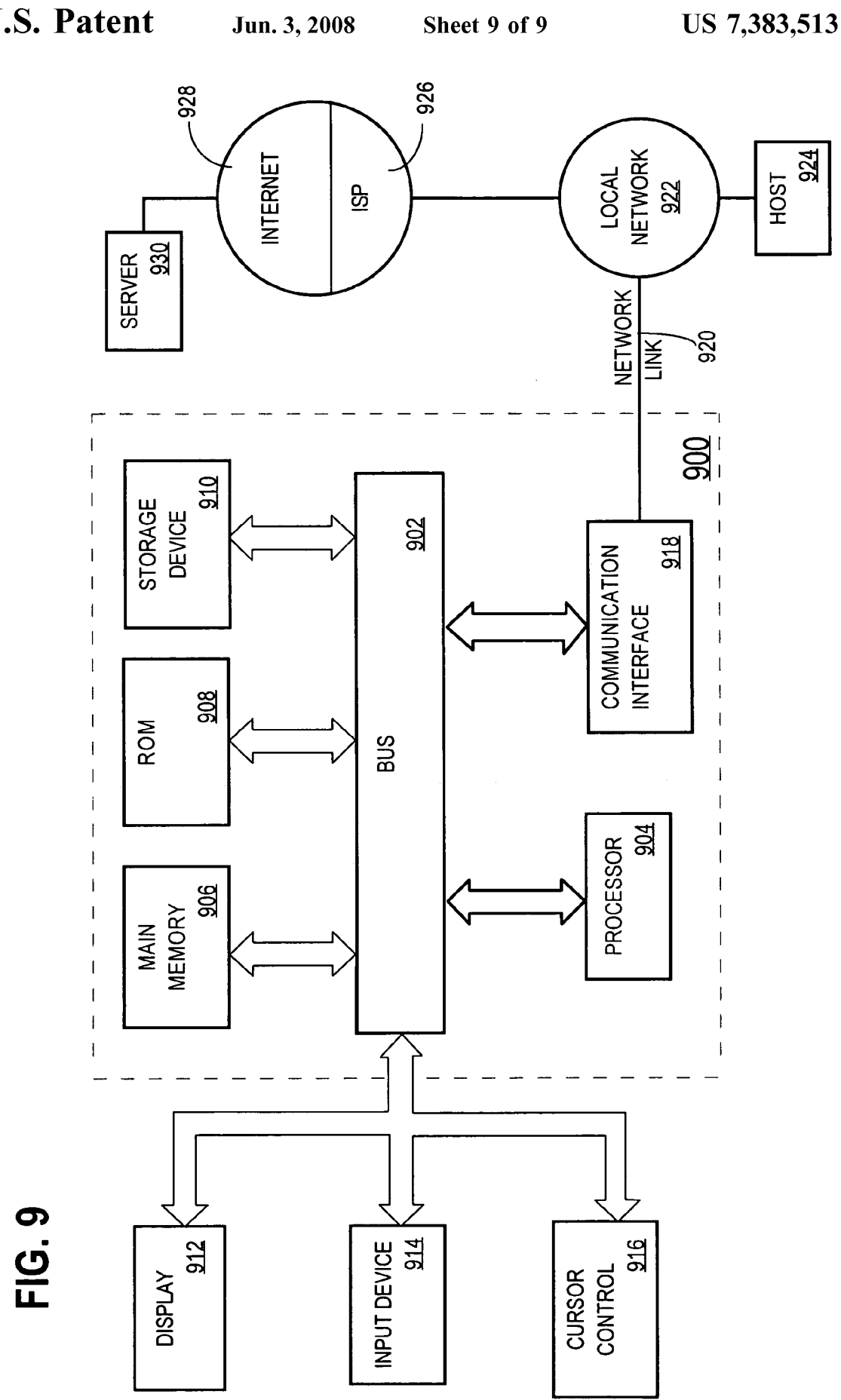
FIG. 9 is a block diagram that illustrates a computer system 900 upon which an embodiment of the invention may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for searching a database using a graphical condition builder to formulate the query. According to one embodiment of the invention, user input such as selecting an item, double clicking, and dragging and dropping icons are provided by input device 914 or cursor control 916 and response thereto are provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process query steps described herein. One or more processors in a multi-processing arrangement may also be employed to execute the sequences of instructions contained in main memory 906. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in storing one or more instruction for implementing the graphical condition builder of this application and/or for carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector coupled to bus 902 can receive the data carried in the infrared signal and place the data on bus 902. Bus 902 carries the data to main memory 906, from which processor 904 retrieves and executes the instructions. The instructions received by main memory 906 may optionally be stored on storage device 910 either before or after execution by processor 904.

Instructions for running the graphical condition builders of this application may be stored on any one of or any combination of the computer readable mediums that are accessed by computer system 900.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for a graphical condition builder and user interface as described herein.

The received code may be executed by processor 904 as it is received, and/or stored in storage device 910, or other non-volatile storage for later execution. In this manner, computer system 900 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The invention claimed is:

1. A method comprising:
prior to executing a search query to perform a search, displaying a user interface on a display, the user interface displaying a graphical representation of the search query, the graphical representation including at least
    a first graphical preview indication that is a first visually distinct region, having a first starting width and a first ending width, the width of the first visually distinct region continuously narrowing or widening from the first starting width to the first ending width, the first visually distinct region being located in a proximity to a first icon representing a first filter, the first starting width having a width that is representative of an expected size of a first input dataset, and the first ending width having a width that is representative of an expected size of a first dataset after application of the first filter on the first input dataset; wherein the first graphical preview indication is separate from the first icon; and
    a second graphical preview indication that is a second visually distinct region, having a second starting width and a second ending width, the second visually distinct region being located in a proximity to a second icon representing a second filter, the second starting width located at the first ending width, the second starting width being equal to the first ending width, the second starting width having a width that is representative of an expected size of a second input dataset, the second input dataset being equal to the first dataset, the second ending width having a width that is representative of an expected size of a second dataset after application of the second filter on the second input dataset, the width of the second visually distinct region continuously narrowing or widening from the second starting width to the second ending width, the second visually distinct region being adjacent to and connected to the first visually distinct region; wherein the second graphical preview indication is separate from the second icon.

2. A method comprising:
prior to executing a search query to perform a search, displaying a user interface on a display, the user interface displaying a graphical representation of the search query, the graphical representation including at least:
    a first icon representing a first filter associated with the search query, and
    a second icon representing a second filter associated with the search query; and the user interface including at least a set of logical operator buttons, wherein each button is associated with a distinct logical operator; and in response to a selection of the first icon and second icon and a selection of a button from the set of logical operator buttons, applying the logical operator associated wit the selected button to a dataset of the first filter represented by the first icon and a dataset of the second filter represented by the second icon; and a graphical preview indication that is a visually distinct region, having a starting width and an ending width, the width of the visually distinct region continuously narrowing or widening from the starting width to the ending width, the visually distinct region being located in a proximity to the first icon and second icon, the starting width having a width that is representative of an expected size of an input dataset, and the ending width having a width that is representative of an expected size of a dataset after application of the logical operator to the dataset of the first filter represented by the first icon and the dataset of the second filter represented by the second icon.

3. The method of claim 2, wherein:
if a Boolean OR operator is applied, the first icon is substantially vertically aligned with the second icon; and
if a Boolean AND operator is applied, the first icon is substantially horizontally aligned with the second icon.

4. The method of claim 2 further comprising:
in response to the selection of the first icon and second icon and the selection of a button from the set of logical operator buttons, displaying a textual indication of a type of logical operator associated with the first icon and second icon.

5. A method comprising:
displaying a user interface on a display, the user interface displaying graphical representations of a search query, wherein at least one or more portions of the search query are divided into one or more query steps represented in the graphical representation as tiled boxes, each of the one or more query steps corresponding to a portion of the search query, each of the one or more query steps including one or more attributes;
wherein each tiled box is able to be independently disabled without removing components of the one or more query steps associated with the tiled box from the graphical representation,
wherein the one or more query steps are a plurality of query steps that are arranged in an order, the order indicated by dataflow lines that connect one or more query steps to succeeding one or more query steps, and the order is alterable by dragging and dropping one or more query steps selected from the plurality of query steps to a new location in the graphical representation.

6. The method of claim 5, wherein:
the one or more query steps are arranged in an order according to a query flow; and each query step is combined with other portions of the search query using Boolean logic.

7. The method of claim 5, wherein the query steps are numbered according to an order in which the query steps are applied.

8. The method of claim 5 further comprising creating within a query step a group icon representing a container for, and having contained within, a group of icons representing a group of filters associated with a portion of the search query.

9. The method of claim 5 further comprising displaying a graphical representation of a search query for a multidimensional database.

10. A computer-readable storage medium carrying one or more sequences of instructions which, when executed by one or more processors, causes the one or more processors to perform the method recited in claim 1.

11. A computer-readable storage medium carrying one or more sequences of instructions which, when executed by one or more processors, causes the one or more processors to perform the method recited in claim 2.

12. A computer-readable storage medium carrying one or more sequences of instructions which, when executed by one or more processors, causes the one or more processors to perform the method recited in claim 3.

13. A computer-readable storage medium carrying one or more sequences of instructions which, when executed by one or more processors, causes the one or more processors to perform the method recited in claim 4.

14. A computer-readable storage medium carrying one or more sequences of instructions which, when executed by one or more processors, causes the one or more processors to perform the method recited in claim 5.

15. A computer-readable storage medium carrying one or more sequences of instructions which, when executed by one or more processors, causes the one or more processors to perform the method recited in claim 6.

16. A computer-readable storage medium carrying one or more sequences of instructions which, when executed by one or more processors, causes the one or more processors to perform the method recited in claim 7.

17. A computer-readable storage medium carrying one or more sequences of instructions which, when executed by one or more processors, causes the one or more processors to perform the method recited in claim 8.

18. A computer-readable storage medium carrying one or more sequences of instructions which, when executed by one or more processors, causes the one or more processors to perform the method recited in claim 9.

19. The method of claim 2 wherein:
the logical operators associated with the set of logical operator buttons comprises:
a Boolean OR operator,
a Boolean AND operator, and
a logical NOT operator.

20. A computer-readable storage medium carrying one or more sequences of instructions which, when executed by one or more processors, causes the one or more processors to perform the method recited in claim 19.

21. The method of claim 5 wherein dataflow lines indicate a Boolean operator being applied to the one or more query steps and the succeeding one or more query steps.

22. A computer-readable storage medium carrying one or more sequences of instructions which, when executed by one or more processors, causes the one or more processors to perform the method recited in claim 21.

* * * * *

UNITED STATES PATENT AND TRADEMARK OFFICE
CERTIFICATE OF CORRECTION

PATENT NO.        : 7,383,513 B2
APPLICATION NO. : 10/672146
DATED             : June 3, 2008
INVENTOR(S)       : Goldberg et al.

It is certified that error appears in the above-identified patent and that said Letters Patent is hereby corrected as shown below:

On the title page, item (74), in "Attorney Agent or Firm", in column 2, line 1, delete "Palmero" and insert -- Palermo --, therefor.

On the title page, item (57), in "Abstract", in column 2, line 9, delete "multidimentional" and insert -- multidimensional --, therefor.

On page 2, in column 2, under "Other Publications", line 27, delete "Oracel" and insert -- Oracle --, therefor.

On page 2, in column 2, under "Other Publications", line 57, delete ""AW_Cube_Create_Access Procedure,"" and insert -- "AW_CUBE_CREATE_ACCESS Procedure," --, therefor.

In column 1, line 66, delete "Digial" and insert -- Digital --, therefor.

In column 12, line 22, after "position of" delete "the".

In column 21, line 7, in claim 2, delete "wit" and insert -- with --, therefor.

UNITED STATES PATENT AND TRADEMARK OFFICE
CERTIFICATE OF CORRECTION

PATENT NO.        : 7,383,513 B2
APPLICATION NO.   : 10/672146
DATED             : June 3, 2008
INVENTOR(S)       : Goldberg et al.

It is certified that error appears in the above-identified patent and that said Letters Patent is hereby corrected as shown below:

In column 21, line 49, in claim 5, delete "representation," and insert -- representation; and --, therefor.

Signed and Sealed this

Seventh Day of July, 2009

JOHN DOLL
*Acting Director of the United States Patent and Trademark Office*